(12) United States Patent
Qian et al.

(10) Patent No.: US 11,082,287 B2
(45) Date of Patent: Aug. 3, 2021

(54) DATA DRIVEN SYSTEMS AND METHODS TO ISOLATE NETWORK FAULTS

(71) Applicant: AT&T Intellectual Property I, L.P., Atlanta, GA (US)

(72) Inventors: Zhiqiang Qian, Holmdel, NJ (US); Michael Zinnikas, North Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 211 days.

(21) Appl. No.: 16/298,296

(22) Filed: Mar. 11, 2019

(65) Prior Publication Data
US 2020/0295984 A1    Sep. 17, 2020

(51) Int. Cl.
| G06F 11/00 | (2006.01) |
| H04L 12/24 | (2006.01) |
| G06F 9/455 | (2018.01) |
| H04L 29/06 | (2006.01) |

(52) U.S. Cl.
CPC ...... *H04L 41/0659* (2013.01); *G06F 9/45558* (2013.01); *H04L 41/0604* (2013.01); *H04L 63/20* (2013.01); *G06F 2009/45595* (2013.01)

(58) Field of Classification Search
CPC .................................................. H04L 41/0659
See application file for complete search history.

(56) References Cited

U.S. PATENT DOCUMENTS

| 8,750,187 | B2 | 6/2014 | Attar | |
| 9,578,593 | B2 | 2/2017 | McCann | |
| 10,498,608 | B2 * | 12/2019 | Sethi | H04L 43/10 |
| 10,574,513 | B2 * | 2/2020 | Nagarajan | H04L 43/0805 |
| 10,628,152 | B2 * | 4/2020 | Chandramouli | G06F 8/76 |
| 10,684,940 | B1 * | 6/2020 | Kayal | G06F 11/3664 |
| 2009/0109959 | A1 * | 4/2009 | Elliott | H04L 12/1403 370/352 |
| 2016/0373359 | A1 | 12/2016 | Bruun et al. | |
| 2017/0063599 | A1 * | 3/2017 | Wu | H04L 41/5035 |
| 2017/0093750 | A1 * | 3/2017 | McBride | H04L 47/762 |
| 2017/0187607 | A1 | 6/2017 | Shaikh et al. | |
| 2018/0013667 | A1 | 1/2018 | Hallivuori et al. | |
| 2018/0123922 | A1 * | 5/2018 | Nataraj | H04L 41/0631 |
| 2018/0164791 | A1 * | 6/2018 | Debes | G05B 19/41855 |
| 2018/0198845 | A1 * | 7/2018 | Kulp | G06F 8/60 |
| 2018/0270107 | A1 * | 9/2018 | Nassar | H04L 41/0686 |

(Continued)

FOREIGN PATENT DOCUMENTS

CN    105429806 A    3/2016

*Primary Examiner* — Jonathan D Gibson
(74) *Attorney, Agent, or Firm* — BakerHostetler

(57) ABSTRACT

Methods, systems and computer readable media for isolating network faults are provided. A data driven automation services module is provided Including a data connector, a data driven policy designer and a data driven self-service engine. The data connector collects data from the plurality of network data sources and integrates the data into shared communities for insight development. The data driven policy designer creates and stores templates and develops policies to implement service tasks to identify and isolate network problems. The data driven self-service engine integrates the network and its orchestration capabilities with big data technology to develop a plurality of microservices to perform service tasks.

20 Claims, 7 Drawing Sheets

(56) References Cited

U.S. PATENT DOCUMENTS

| | | | |
|---|---|---|---|
| 2018/0270125 A1* | 9/2018 | Jain | G06F 16/00 |
| 2018/0324712 A1 | 11/2018 | Wang et al. | |
| 2018/0359338 A1 | 12/2018 | Vyas et al. | |
| 2018/0367371 A1* | 12/2018 | Nagarajan | H04L 43/0811 |
| 2018/0367412 A1* | 12/2018 | Sethi | H04L 41/0853 |
| 2019/0238399 A1* | 8/2019 | Perreira | G06F 11/0751 |
| 2019/0245766 A1* | 8/2019 | Onoue | G06F 11/3495 |
| 2019/0317776 A1* | 10/2019 | Walsh | H04L 67/22 |
| 2019/0340059 A1* | 11/2019 | Bagarolo | G06F 11/0793 |
| 2019/0356555 A1* | 11/2019 | Bai | H04L 41/142 |
| 2019/0363934 A1* | 11/2019 | Li | H04L 41/04 |
| 2020/0110667 A1* | 4/2020 | Al-Alem | G06F 11/1479 |

\* cited by examiner

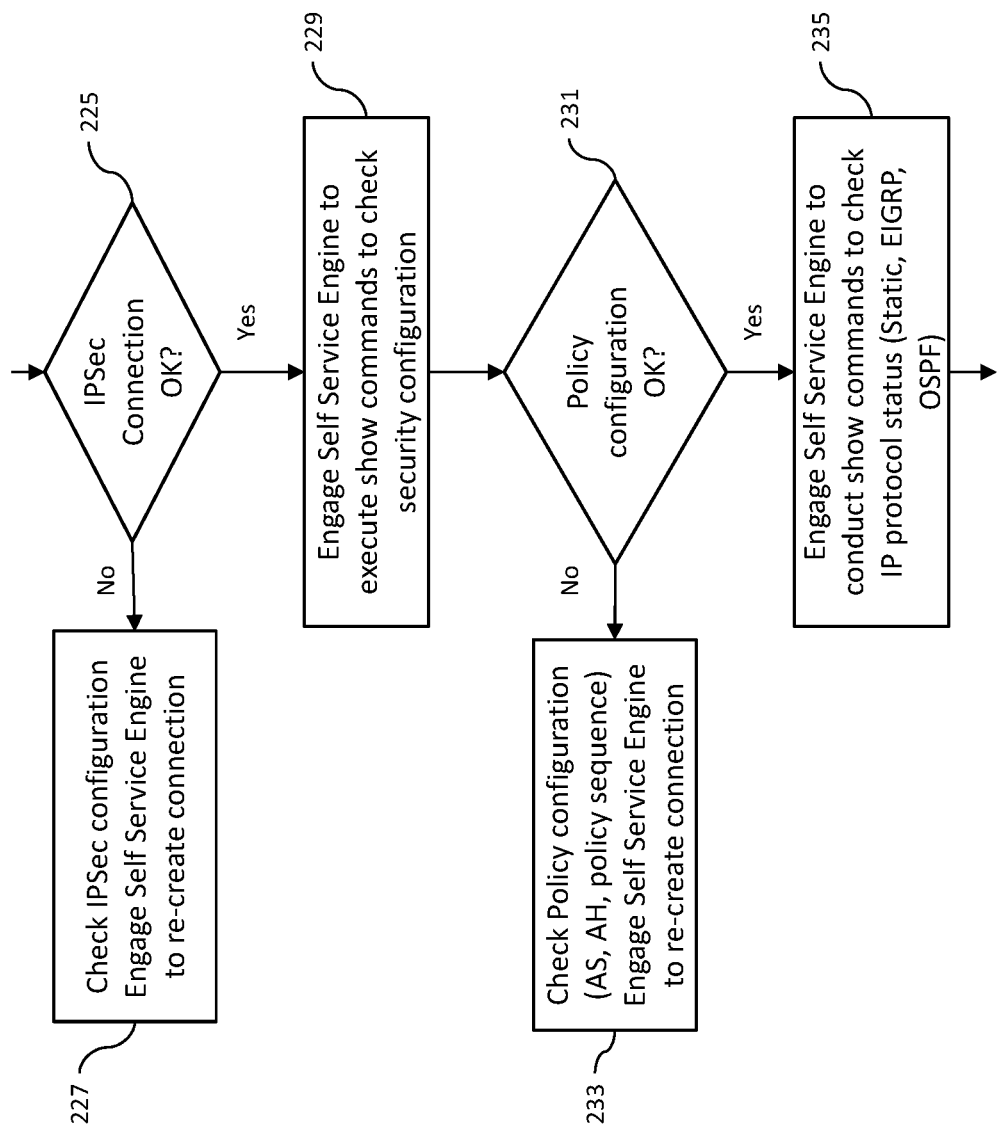

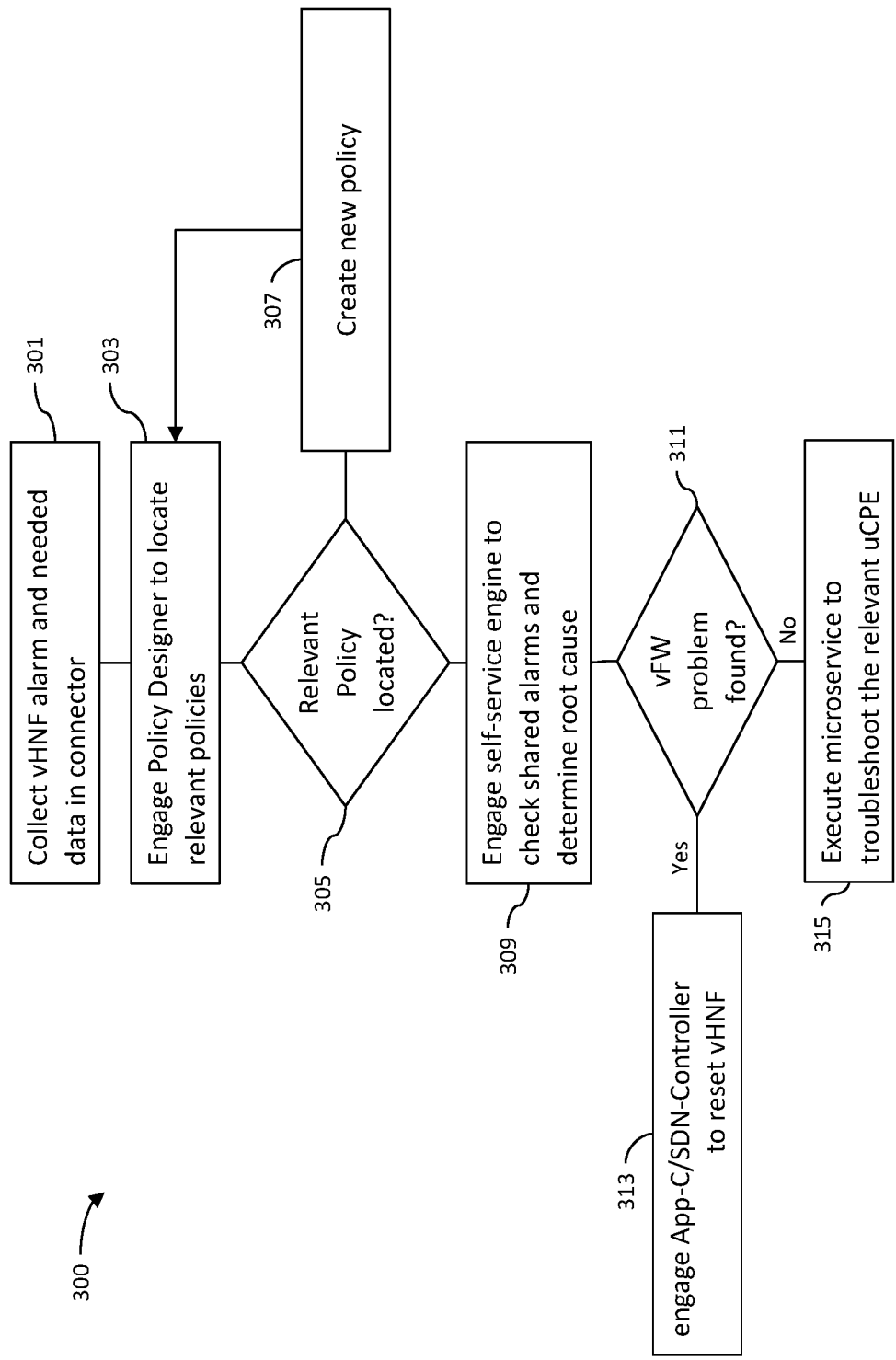

DATA DRIVEN SYSTEMS AND METHODS TO ISOLATE NETWORK FAULTS

TECHNICAL FIELD

The present disclosure relates to the management of networks. More particularly, the disclosure relates to data driven isolation of network faults using dynamic data sharing, domain knowledge mingling, fast decision making, and constant collaboration with SDN-enabled capabilities including artificial intelligence/machine learning oriented micro services.

BACKGROUND

Network virtualization and software defined network (SDN) oriented technologies are growing faster than operational technicians and users can keep up with. For example, Software defined wide area networks (SD-WAN) technology is able to provide the dynamic connection capabilities and cost-saving benefits for the customers, but may be less stable and less predictable than virtual private network (VPNs). Thus, more and more customers are opting for a hybrid network solution combining SD-WAN technology (for data traffic) and VPN (for voice traffic) to meet their telecommunication needs. This hybrid network technology constitutes a great challenge in terms of network maintenance and service assurance due to its mixture of network layers including VPN, IPSec, Security Policy, and IP Tunnel protocols. Currently, network operators have to rely on manual work to troubleshoot the problems related to SD-WAN, which is time-consuming and labor intensive.

Therefore, there is a strong need for data-driven automation platforms to better isolate network troubles resulting from new technologies, with minimal human intervention.

SUMMARY

In one embodiment, the present disclosure includes a system for identifying and isolating network problems comprising an orchestration platform having a data connector, a data driven policy designer and a data driven self-service engine. The data connector collects data from a plurality of network data sources and integrates the data into shared communities for insight development. The data driven policy designer creates and stores templates and develops policies to implement service tasks to identify and isolate the network problems. The data driven self-service engine integrates the network and its orchestration capabilities with big data technology to develop a plurality of microservices to perform service tasks.

In another embodiment, the present disclosure teaches a method for identifying and isolating network problems. The method includes the step of collecting data from a plurality of network sources in a data connector. The method also includes integrating the data into shared communities for insight development. The method further includes accessing a data driven policy designer to develop policies to fulfill a plurality of service tasks. The method further includes accessing a data driven self-service engine to determine if there is an appropriate micro service from a plurality of microservices capable of performing a selected service task from the plurality of service tasks.

A further exemplary embodiment includes a non-transitory computer readable storage medium having computer-executable instructions that, when executed, cause a computer system to collect data from a plurality of network sources in a data connector. The computer-executable instructions further include instructions to integrate the data into shared communities for insight development. The computer-executable instructions further include instructions to access a data driven policy designer to develop policies to fulfill a plurality of service tasks. The computer-executable instructions further include instructions to access a data driven self-service engine to determine if there is an appropriate micro service from a plurality of microservices capable of performing a selected service task from the plurality of service tasks.

DETAILED DESCRIPTION OF ILLUSTRATIVE EMBODIMENTS

Figure 1:
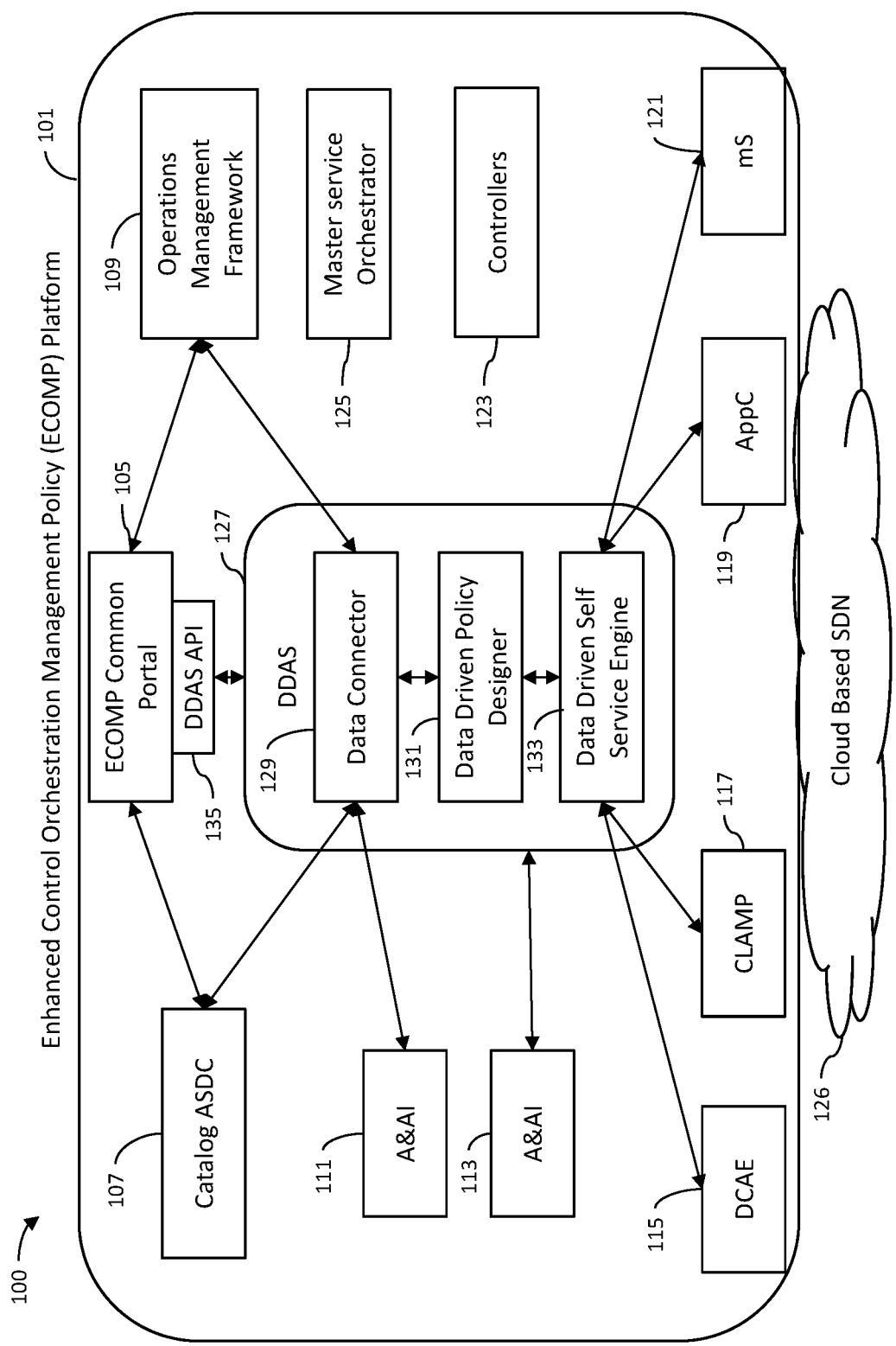
FIG. 1 is a schematic of a system architecture for a data driven system to isolate network faults.

Unless otherwise noted, or as may be evident from the context of their usage, any terms, abbreviations, acronyms or Scientific symbols and notations used herein are to be given their ordinary meaning in the technical discipline to which the disclosure most nearly pertains. The following terms, abbreviations and acronyms may be used throughout the descriptions presented herein and should generally be given the following meaning unless contradicted or elaborated upon by other descriptions set forth herein. Some of the terms set forth below may be registered trademarks ®. When glossary terms (such as abbreviations) are used in the description, no distinction should be made between the use of capital (uppercase) and lowercase letters Glossary of Terms and Acronyms The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to the following terms or common variations thereof:

A&AI—Active and Available Inventory. Active and Available Inventory is the "one-stop-shop" where all the network information comes together. Modern networks are complex, dynamic, and difficult to manage, and A&AI delivers live insight into hybrid services and virtual resources, in support of closed loop processes.

ADI—AT&T Dedicated Internet

Application Controller. The application controller (AppC), receives orchestrated requests from a master service orchestrator (MSO), which obtains application-specific components and attributes from a service design and creation component. The MSO continues to be responsible for ensuring that the AppC successfully completes its resource configuration as defined by the workflow.

AS—Autonomous system is a collection of connected Internet Protocol (IP) routing prefixes under the control of one or more network operators on behalf of a single administrative entity or domain that presents a common, clearly defined routing policy to the internet.

BGP—Border Gateway Protocol is a standardized exterior gateway protocol designed to exchange routing and reachability information among autonomous systems (ASs) on the Internet. The protocol is classified as a path vector protocol.

Big Data Technology. Unlike traditional data, the term Big Data refers to large growing data sets that include heterogeneous formats: structured, unstructured and semi-structured data. Big Data has a complex nature that require powerful technologies and advanced algorithms. Big Data computing is an emerging data science paradigm of multi-dimensional information mining for scientific discovery and business analytics over large scale infrastructure. Big Data processing organizes and extracts the valued information from large, changing data sets collected from multiple, and autonomous sources in the minimal possible time, using several statistical, and machine learning techniques. Current Big Data platforms are supported by various processing, analytical tools as well as dynamic visualization. Such platforms are able to extract knowledge and value from complex dynamic environment. They also support decision making through recommendations and automatic detection of anomalies, abnormal behavior or new trends.

CE—Customer edge is the router at the customer premises that is connected to the provider edge of a service provider IP/Multiprotocol Label Switching network. CE peers with the Provider Edge (PE) and exchanges routes with the corresponding virtual routing and forwarding inside the PE.

DCAE module—Data Collection, Analytics and Events module

DMaap—data movement as a platform is a platform for high performing and cost-effective data movement services that transports and processes data from any source to any target with the format, quality, security, and concurrency required to serve the business and customer needs.

eBGP—External BGP running between different autonomous systems. It is the version of BGP that is used to exchange BGP routing updates between two different autonomous systems. eBGP is implemented on the edge BGP router that provides interconnection to other autonomous systems.

EIBGP—eiBGP Multipath is the installation of one or more internal and one or more external BGP paths.

Flexware—A network virtualization solution that allows businesses to deploy multiple network functions on a single device while replacing traditional purpose-built hardware and turning network functions into software instances.

Hybrid Network—is any computer network that uses more than one type of connecting technology, communication standards or topology. For example, MPLS and Internet-based VPN services can be combined to create a single, dynamically-routed hybrid network.

iBGP—Internal Border Gateway Protocol (iBGP) is a term used to describe an area of BGP operation that runs within an organization or autonomous system. Internal BGP is a method employed to provide more information to your internal routers. iBGP could be said to be one of the peers of BGP routers. iBGP Multipath is the installation of two or more internal BGP paths.

IP Tunnel—An IP tunnel is an Internet Protocol (IP) network communications channel between two networks. It is used to transport another network protocol by encapsulation of its packets.

IPsec—Internet Protocol Security is a secure network protocol suite that authenticates and encrypts the packets of data sent over an internet protocol network.

Microservices—is an architectural style that structures an application as a collection of services that are: highly maintainable and testable; loosely coupled; independently deployable; and organized around business capabilities. Microservices are a software development technique—a variant of the service-oriented architecture (SOA) architectural style that structures an application as a collection of loosely coupled services. In a microservices architecture, services are fine-grained, and the protocols are lightweight. The benefit of decomposing an application into different smaller services is that it improves modularity. This makes the application easier to understand, develop, test, and become more resilient to architecture erosion.

Network Controller. A Network Controller, such as SDN-C, instantiates a Virtual Network Function by carrying out its network configuration workflow and reporting the resulting status. Network controllers are responsible for the provisioning, management and control of services and related resources.

OSPF—Open Shortest Path First (OSPF) is a routing protocol for Internet Protocol (IP) networks. It uses a link state routing (LSR) algorithm and falls into the group of interior gateway protocols (IGPs), operating within a single autonomous system.

PE—provider edge A Provider Edge router (PE router) is a router between one network service provider's area and areas administered by other network providers. PMO present model of operations.

SD-WAN—software-defined networking in a wide area network (WAN). An SD-WAN simplifies the management and operation of a WAN by decoupling (separating) the networking hardware from its control mechanism.

Service Chain—A service chain is a set of network services, such as firewalls or application delivery controllers (ADCs) that are interconnected through the network to support an application. SDN and NFV can shorten and simplify the service chain and application provisioning process.

uCPE—Universal customer premises equipment. uCPE consists of software virtual network functions (VNFs) running on a standard operating system hosted on an open server. An ideal uCPE deployment supports a multi-vendor multi-component construction.

VFW—virtual firewall is a firewall device or service that provides network traffic filtering and monitoring for virtual machines (VMs) in a virtualized environment. Like a traditional network firewall, a virtual firewall inspects packets and uses security policy rules to block unapproved communication between virtual machines.

vHNF—virtual hybrid network function.

vHNGW virtual hybrid network gateway

Virtual Network Function. Virtual network functions (VNFs) are virtualized tasks formerly carried out by proprietary, dedicated hardware. VNFs move individual network functions out of dedicated hardware devices into software that runs on commodity hardware. These tasks, used by both network service providers and businesses, include firewalls, domain name system (DNS), caching or network address translation (NAT) and can run as virtual machines (VMs).

VPN—virtual private network, a private network that uses a public network (usually the Internet) to connect remote sites or users together.

vVIG—is a virtual machine that acts as an IPSec gateway between unsecure and secure networks, providing data security at the IP packet level. It uses Data Plane Development Kit (DPDK) to speed up the cryptographic processing of IPSec data packets.

FIG. 1 illustrates a data driven automation services architecture 100. The data driven automation services architecture 100 includes an enhanced control orchestration management and policy (ECOMP) platform 101. The ECOMP platform 101 enables product/service independent capabilities for design, creation and lifecycle management.

The ECOMP platform 101 includes ECOMP Common portal 105 that provides design functions through a service design and creation component (catalog ASDC 107). ECOMP Common portal 105 provides a common portal framework and UI architecture for creating and operating virtual infrastructure and services. ASDC 107 provides a well-structured organization of visual design and simulation tools, templates and catalogs to model and create resources, services and products. Examples of capabilities include: Common look and feel, role administration, access control, software development kits with plug-ins and web components. Catalog ASDC 107 may provide service design and creation function, policy creation function, product design functions, offer design functions and Virtual network function (VNF) design functions. ECOMP Common portal 105 provides operations functions though operations management framework 109, a framework that provides real-time, policy driven automation of management functions. Operations management framework 109 may include a portal, a test engine middleware and a configuration engine (not shown). The ECOMP Platform 101 may also include active and available inventory (A&AI) modules 111 and 113. A&AI modules 111 and 113 are the components that provides real-time views of the resources, services, products and their relationships. A&AI modules 111 and 113 track the dynamic relationships of virtualized networks, services & resources, their relationships and status to maintain ECOMP platform integrity and the global inventory it manages.

ECOMP Platform 101 also may include Data Collection, Analytics and Events module (DCAE module 115). DCAE module 115 provides real-time fault, performance, event and other data collection, correlation & analysis to manage service, network and infrastructure health and support closed loop automation. DCAE module 115 includes an analytic applications module, streaming framework, an events pub/sub, real-time collectors, APIs, and batch collector. In the integrated cloud environment virtualized functions across various layers of functionality are expected to be instantiated in a significantly dynamic manner that requires the ability to provide real-time responses to actionable events from virtualized resources, applications, as well as requests from customers, carrier partners and other providers. In order to engineer, plan, bill and assure these dynamic services, DCAE module 115 within the framework of the ECOMP platform 101 gathers key performance, usage, telemetry and events from the dynamic, multi-vendor virtualized infrastructure in order to compute various analytics and respond with appropriate actions based on any observed anomalies or significant events. These significant events include application events that lead to resource scaling, configuration changes, and other activities as well as faults and performance degradations requiring healing. The collected data and computed analytics are stored for persistence as well as use by other applications for business and operations (e.g., billing, ticketing). More importantly, the DCAE module 115 has to perform a lot of these functions in real-time.

ECOMP platform 101 may include a Control Loop Automation Management Platform module (CLAMP module 117). CLAMP module 117, in its basic form, includes three components. (a) A portal which is essentially a web browser that enables authentication, construction, configuration, certification, testing, governance approval and distribution of control loop templates. (b) A work-flow engine that enables translation of the design template into an executable data model. The work-flow engine communicates with ECOMP through a set of well-defined ECOMP-specified APIs. (c) A monitoring dashboard that enables telemetry data capture relevant to the performance of the control loop, status update and diagnosis of failures. CLAMP module 117 include CLAMP APIs to enable access by various components and modules.

ECOMP Platform 101 may include an application controller (AppC 119). AppC 119 performs functions to manage the lifecycle of VNFs and their components providing model driven configuration, abstracts cloud/VNF interfaces for repeatable actions, uses vendor agnostic mechanisms and enables automation. Application Controllers configure, monitor and maintains the health of an applications throughout their lifecycle. AppC 119 include AppC APIs to enable access by various components and modules.

ECOMP Platform 101 may include an microservice module (mS module 121). mS modules 121 provides microservices through a set of microservice APIs.

ECOMP Platform 101 may include controllers 123. Controllers 123 are applications which are intimate with cloud and network services and execute the configuration, real-time policies, and control the state of distributed components and services. Controllers 123 may include three distinct Controller types that manage resources in the execution environment corresponding to their assigned controlled domain such as cloud computing resources (Infrastructure Controller, typically within the cloud layer), network configuration (Network Controller) and application (Application Controller).

ECOMP Platform 101 may also include a master service orchestrator (MSO 125). The primary function of MSO 125 is the automation of end-to-end service instance provisioning activities. MSO 125 arranges, sequences and implements tasks based on policies and rules/recipes to coordinate the creation, modification or removal of logical and physical resources in the managed environment. MSO 125 includes a request handler, an orchestration engine, adapters, and service catalog service recipes. MSO provides an interface to orchestrate delivery of integrated cloud environment services. In general, orchestration can be viewed as the definition and execution of workflows or processes to manage the completion of a task. The ability to graphically design and modify a workflow process is the key differentiator between an orchestrated process and a standard compiled set of procedural code. Orchestration provides adaptability and improved time-to-market due to the ease of definition and change without the need for a development engagement. As such, it is a primary driver of flexibility in the architecture. Interoperating with policies, the combination provides a basis for the definition of a flexible process that can be guided by business and technical policies and driven by process designers.

ECOMP Platform 101 manages the cloud-based software defined network 126.

ECOMP Platform 101 may include a data driven automation services module (DDAS Module 127. DDAS module 127 may include a data connector 129. Data connector 129 is a stand-alone software or a function within a program that gathers dynamic on-demand data sets from various entity sources, calculates network and service performances based on dynamic and historical data, and integrates the actionable data sets into shared communities for insight development to support fault-driven and order-driven service assurance automation. The data connector 129 proactively monitors network and service chain performances, quickly locates a malfunctioned network device or function by comparing real-time data set with the benchmark one when a network outage occurs, collects relevant network data associated with the service chain when a customer service is changed. The data connector 129 normalizes the actionable data sets for the next activity taken by data community users.

DDAS module 127 may include a data driven policy designer 131. The data driven policy designer 131 provides templates to combine the best human intelligence and machine learning capabilities for policy design and building block development as well as enhance collaboration among data community users to solve business problems. The policies are modifiable rules, assertions and/or conditions to enable real-time decision making on corrective actions and configuration changes in the software-centric network ecosystem. Data driven policy designer 131 develops policies to fulfill service tasks originated from fault-driven VNF orchestration (e.g. network outage), order-driven VNF orchestration and infrastructure VNF orchestration.

DDAS module 127 may include a data driven self-service engine 133. Data driven self-service engine 133 integrates software defined network 126 and its orchestration capabilities with big data technology to develop small, discrete, and reusable micro services that can team up as needed to perform a service task. Data driven self-service engine 133 houses machine learning/artificial intelligence powered micro services to be used for the data community users. Data driven self-service engine 133 is capable of scanning a catalog of microservices for any reusable micro services and also creating new micro services based on new service design and creation capability of catalog ASDC 107, operations management framework 109, Test Engine template, or a call to the DDAS APIs 135 in DDAS module 127. Data driven self-service engine 133 executes the policies to solve network outages and service-impacting troubles.

Unlike the current policy-driven automation platform that guides the systems on the next automation step by using static rules, DDAS Module 127 provides dynamic data sharing, domain knowledge mingling, fast decision making, and constant collaboration with SDN-enabled capabilities including artificial intelligence/machine learning oriented micro services. Thus, DDAS Module 127 can make a more intelligent and personalized recommendation based on historical data, current conditions, and calculated predictions to drive adaptive changes and determine outcomes proactively.

Illustrated in FIGS. 2A-D is a method 200 for an SD-WAN diagnose microservice 201 to quickly locate the root cause of a customer service-impacting event. The method 200 can be triggered by a customer request, API call, or an automated event.

In step 203, when this microservice is triggered, the method 200 analyzes the request and parses the key data out of the request which includes a customer circuit, IP Address, or PVC ID. The method 200 engages the Data Connector to collect any alarms sourced from the network devices relevant to the customer's circuit, IP Address, or PVC ID. The network devices include but are not limited to Flexware, vHNF, vHNGW, IP Tunnel, VPN PE and ADI PE.

In step 204, the method 200 engages the Data Connector to retrieve the service chain inventory data in SD-WAN network to identify transport types and network components.

In step 205, the method 200 determines whether a network alarm has been found based on the collected alarms and service chain inventory data.

In step 207, if a network alarm is present, then the customer service impacting event results from the network outage. The method 200 engages the Self-service Engine to search any existing network trouble ticket and service trouble ticket based on the service chain inventory data. If found, the method 200 conducts network alarm and ticket correlation.

In step 209 if the network alarm is not found, then the method 200 engages the Data Driven Policy Designer to analyze the collected data of the IP tunnel segment and identify a root cause. The Data Driven Policy Designer may have existing policies that can be used to analyze the data or if not, it may create a policy to enable such analysis.

In step 211, the method 200 engages Data Driven Self-service Engine to orchestrate the relevant policies provided by Data Driven Policy Designer to examine each hybrid SD-WAN network element along the customer's service path starting with VPN network.

Figure 2A:
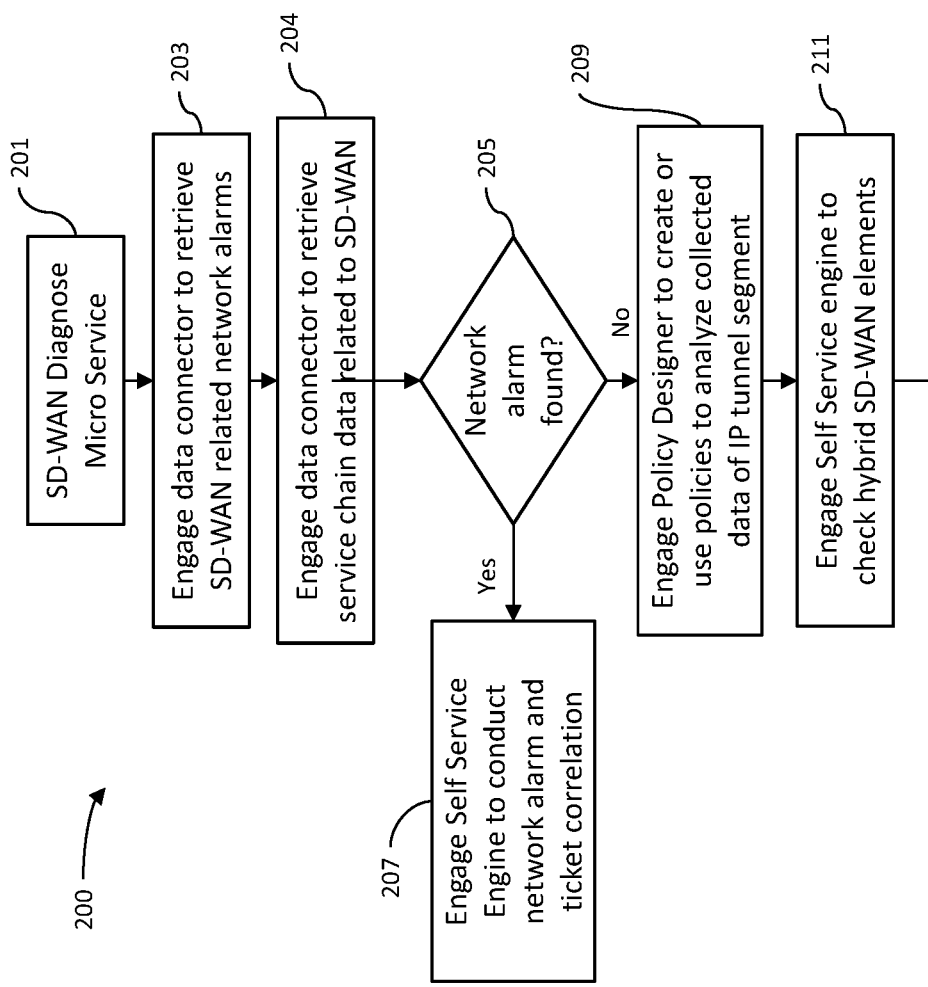
FIGS. 2A-2D is a flowchart of a method for diagnosing faults in an SD-WAN.
Figure 2:
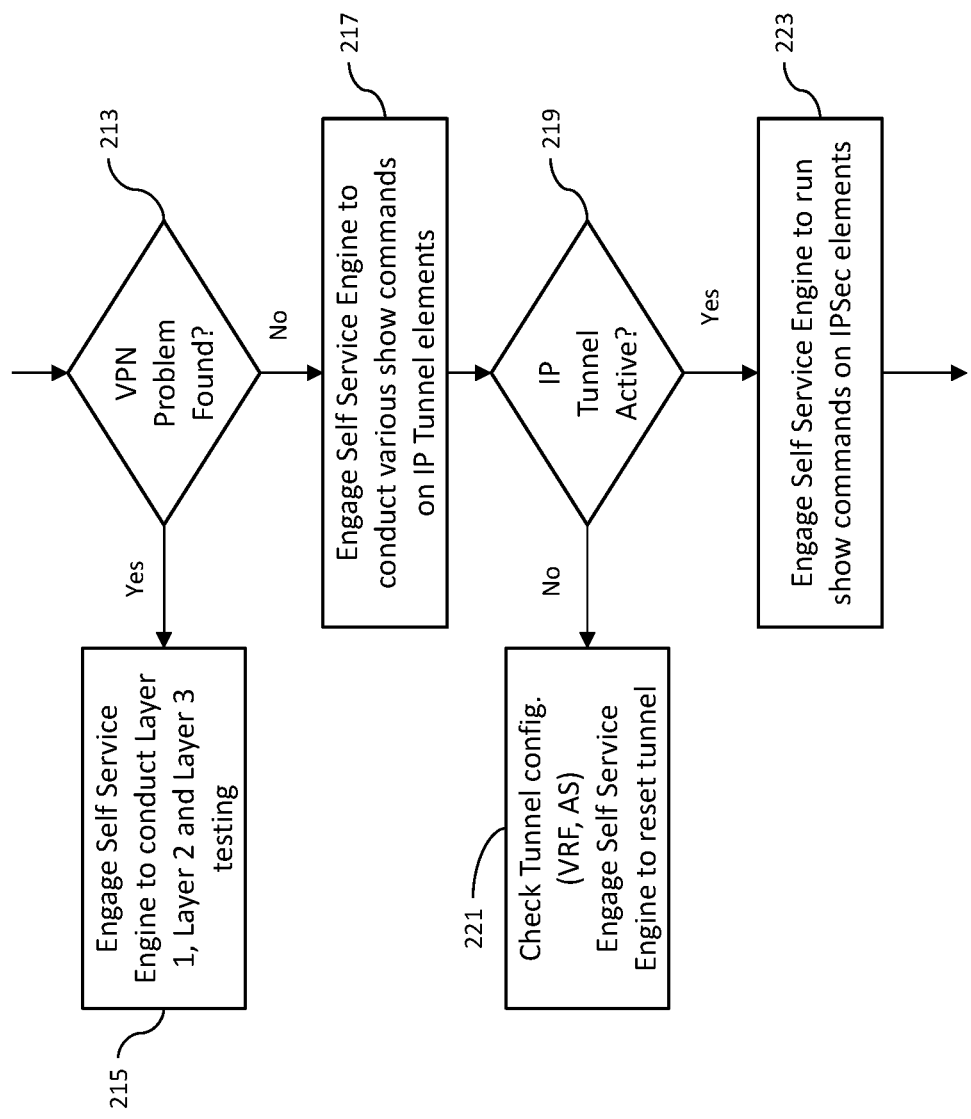
Figure 2:
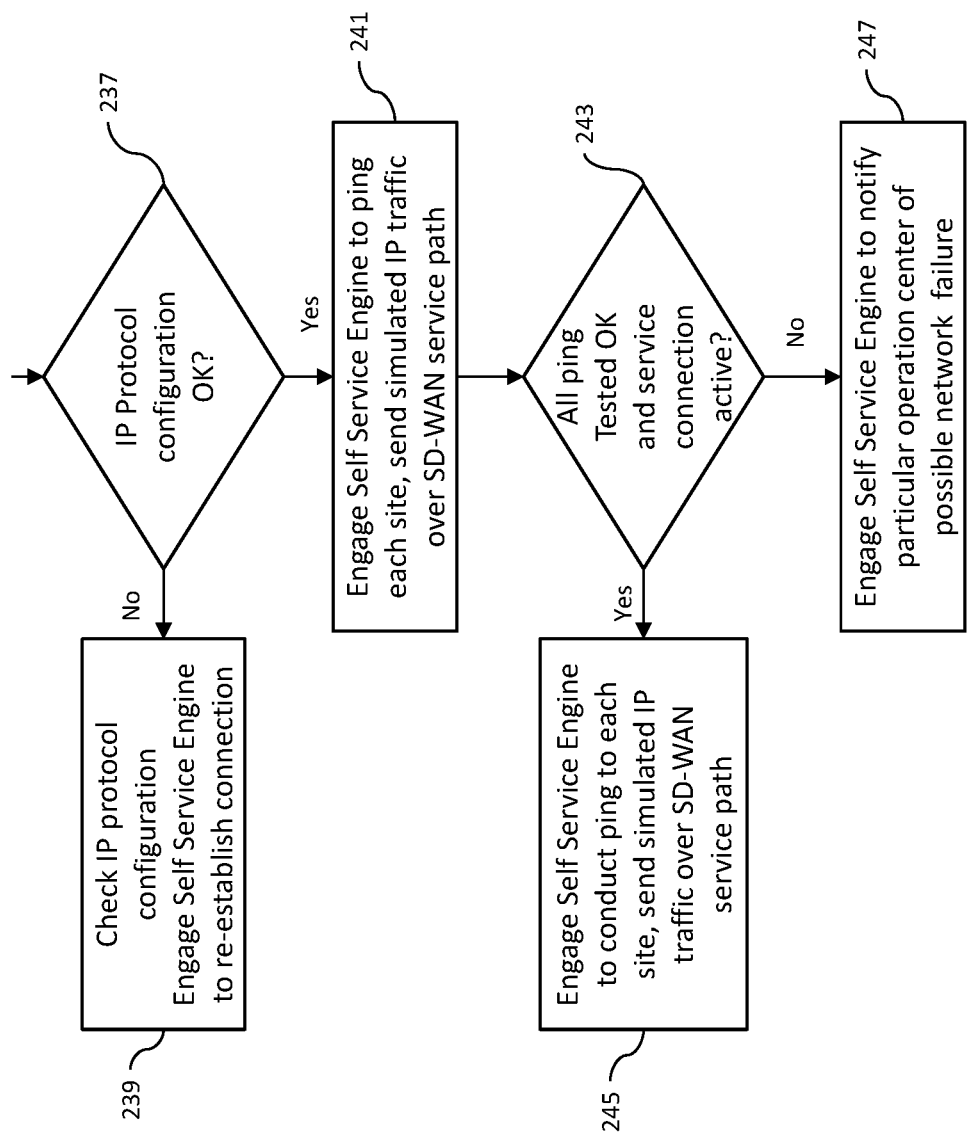

Step 213 is illustrated in FIG. 2 B. In step 213, the method 200 determines if the VPN problem has been found.

If the VPN problem has been found, then in step 215, the method 200 engages the Data Driven Self-Service Engine to conduct Layer 1, Layer 2 and Layer 3 testing.

If the VPN problem has not been found, then in step 217, the method 200 engages the Data Driven Self-service Engine to check IP Tunnel status by conducting various show commands on IP Tunnel elements. This comprises conducting IP interface testing on the ports of Flexware, vHNF, vHGW, ADI/VPN PE if no alarm is found. In this step the method 200 gets router snapshots/show interface/show IP interface/ping to check both physical and logical port status as well as VPN connectivity. The show command determines whether the tunnel is up or down, the number of packets received and sent on the tunnel since it was last cleared by the administrator and the number of keepalive packets sent and received on the tunnel since it was last cleared by the administrator.

In step 219, the method 200 determines whether the IP tunnel is active (when VPN is active and Flexware is free of trouble). This includes showing the interface tunnel <number> brief to check the tunnel status, IP address, encapsulation type, and MTU throughput and show interface tunnel (number) description to check tunnel interfaces If the IP tunnel is not active, then in step 221, the method 200 checks the tunnel configuration (VPN routing and forwarding, autonomous systems) and engages the Data Driven Self-service Engine to reset tunnel configurations.

If the IP tunnel is active, then in step 223, the method 200 engages the Data Driven Self-service Engine to run show commands on IPSec elements. This may include commands "show security ipsec security-association/show crypto isakmp sa" to check IPSec connection status Step 225 is illustrated in FIG. 2C. In step 225, the method 200 determines if the IPSec connection is working.

If the IPSec connection is not working then in step 227, the method 200 checks the IPSec configuration and engages the Data Driven Self-service Engine to re-create connection.

If the IPSec connection is working, then in step 229, the method 200 engage the Data Driven Self-service Engine to execute show commands to check security configuration.

In step 231, the method 200 checks to determine if the policy configuration is correct. This step is to verify security policies and security configurations including security association, encapsulation security payload, and security authentication header and may include Show security ipsec security-association/show security ike/show security ipsec/show security policies/show crypto ipsec sa to checks Security Association (SA) status, Encapsulating Security Payload (ESP), Authentication Header (AH), and Internet Key Exchange (IKE).

If the policy configurations are not OK, then in step 233, the method 200 checks the policy configuration (AS, AH, policy sequence) and engages the Data driven Self-service Engine to re-create the connection.

If the policy configurations are correct, then in step 235, the method 200 engages the Data driven Self-service Engine to conduct show commands to check the IP routing protocol status (including Static, Enhanced Interior Gateway Routing Protocol (EIGRP), and Open Shortest Path First OSPF protocol). This may include implementing Show interface/show version//show ip route/show neighbor to check autonomous system number, source and destination interfaces, and adjacent neighbors.

Step 237 is illustrated in FIG. 2 D. In step 237, the method 200 determines if the IP protocol configuration is correct.

If the IP protocol configuration is not correct, then in step 239, the method 200 checks IP protocol configuration and engages the Data Driven Self-service Engine to re-establish connection.

If the IP protocol configuration is correct, then in step 241, the method 200 engages Data Driven Self-service Engine to ping each site and send simulated IP traffic over SD-WAN service path to verify customer service connect when the problem is fixed or no problem is found.

In step 243, the method 200 determines if all pings have tested OK and if the service connection is active.

If all the pings have tested OK, then in step 245, the method 200 engages the Data Driven Self-service Engine to inform the customer or end user that the service has been restored.

If all the pings did not test OK, then in step 247, the method 200 engages the Data Driven Self-service Engine to notify a particular operation center of a possible network failure.

The method 200 may also manipulate ticket activities including auto-closure, auto-referral, and auto-notification based on the diagnose result when the root cause is found.

Figure 3:
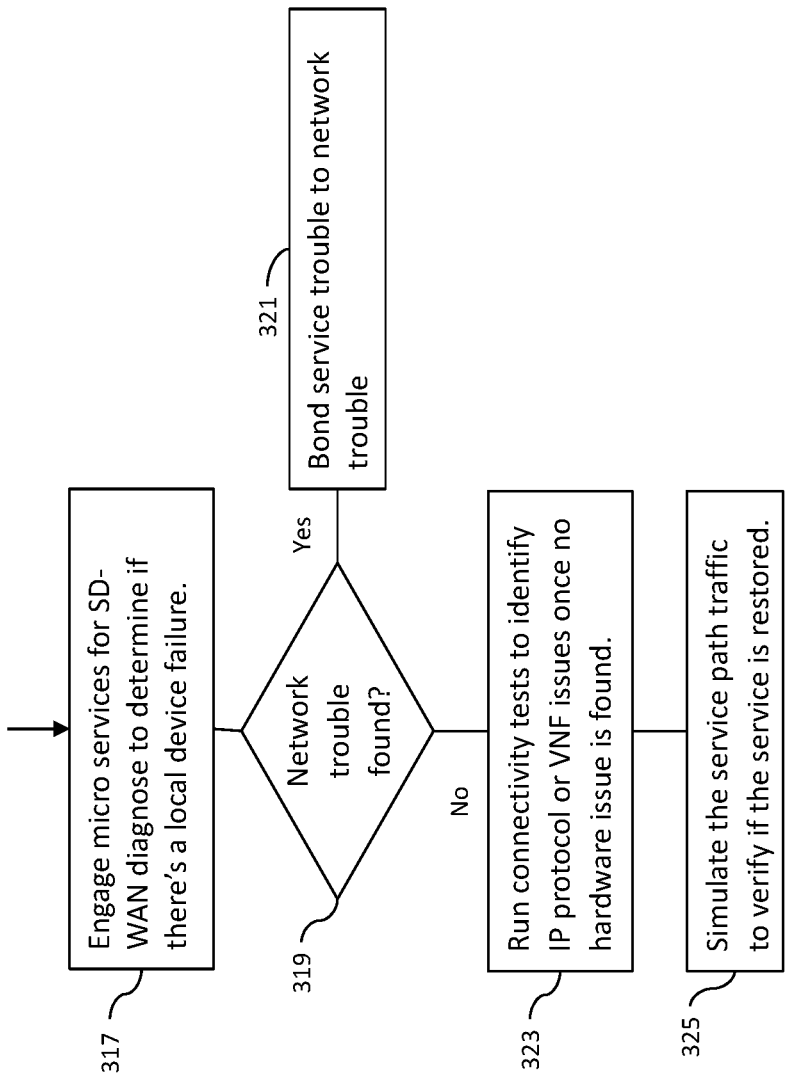
FIGS. 3A-3B is a flowchart of a method for providing event driven microservice for vHNF outage.

Illustrated in FIGS. 3A-B is a method 300 for providing event driven microservice for handling a network outage resulting from a network element failure such as vHNF outage. The method 300 employs the Data Connector, Data-driven Policy Designer, and Data-driven Self Service Engine: The Data Connector subscribes to various DMaaP events to collect network equipment and facility alarms. It mingles SDN functions with big data technologies to identify any actionable alarms. Data-driven Policy Designer uses policy templates to design policies to troubleshoot service troubles associated with each segment of the customer's service path. Data-driven Self Service Engine assembles artificial intelligence/machine learning powered microservices and policies to identify a root cause or restore a failed service.

In step 301, the method 300 collects vHNF alarm metrics and the relevant inventory data from various trusted member data sources including A&AI, DCAE, and EDF in the Data Connector.

In step 303, the method 300 engages the Data Driven Policy Designer to find the existing policies relevant to vHNF network layout.

In step 305, the method 300 determines if a relevant policy has been located.

If a relevant policy has not been located, then in step 307 the Data Driven Policy Designer creates a new policy.

If a relevant policy is located or created, then in step 309, the method 300 engages the Data Driven Self-service Engine and checks the shared alarm sources (both virtual and physical elements) to determine the root cause including the alarms sourced from vHNF, vVIG, vHNGW, IP Tunnel, AVPN PE and ADI PE.

In step 311, the method 300 checks to determine if a vFW problems has been found.

If the vFW problem is found, then in step 313, the method 300 engages the App-C/SDN Controller to reset the vHNF by re-configuring vFW parameters.

If a problem is not found, then in step 315, the method 300 executes a Flexware/uCPE micro service to troubleshoot the relevant uCPE.

In step 317, the method 300 Engage various micro services/policies for SD-WAN diagnosis including Flexware, Ethernet, IP Tunnel, and AVPN PE, to determine if there's a local device failure.

In step 319, the method 300 determines whether there has been a local device failure.

If a local network problem is found, then in step 321 the method 300 bonds the service problem to the network problem. The service problem would be cleared once the network problem is fixed.

If a local network problem is not found, then in step 323, the method 300 runs connectivity tests including OSPF to identify IP protocol or VNF issues once no hardware issue is found.

In step 325, the method 300 simulates the service path traffic to verify that the customer's service has been restored.

An aspect of the disclosure is implemented as a program product for use with a computer system. Program(s) of the program product defines functions of embodiments and can be contained on a variety of machine-readable media, which include, but are not limited to: (i) information permanently stored on computer readable devices including non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the disclosure, represent embodiments of the disclosure.

While the foregoing is directed to embodiments of the present disclosure, other and further embodiments of the disclosure may be devised without departing from the basic scope thereof, and the scope thereof is determined by the claims that follow

What is claimed:

1. A system for identifying and isolating a network problem comprising:
   a network having a plurality of network data sources;
   an orchestration platform coupled to the network and providing orchestration capabilities, the orchestration platform comprising:
      a data driven automation services module comprising:
         a data connector that collects data from the plurality of network data sources and integrates the data into shared communities for insight development;

a data driven policy designer capable of creating and storing templates and developing policies to implement service tasks to identify and isolate the network problem; and a data driven self-service engine that integrates the network and the orchestration capabilities with big data technology to develop a plurality of microservices to perform the service tasks.

2. The system of claim 1 wherein the data driven policy designer uses machine learning to develop the policies.

3. The system of claim 1 wherein the plurality of microservices comprises a plurality of reusable microservices.

4. The system of claim 1 wherein the data collected from a plurality of data sources comprises alarms.

5. The system of claim 1 wherein the data connector collects service chain data to identify transport types and network components.

6. The system of claim 1 wherein the data driven policy designer uses or creates policies to identify root causes of the network problems.

7. The system of claim 1 wherein the plurality of microservices are powered by machine learning or artificial intelligence and are available to be used by the shared communities.

8. A method for identifying and isolating network problems comprising:

collecting data from a plurality of network data sources in a data connector;

integrating the data into shared communities for insight development;

creating and storing templates and developing policies to implement service tasks to identify and isolate network problems; and integrating network and orchestration capabilities with big data technology to develop a plurality of microservices to perform the service tasks.

9. The method of claim 8, wherein the data driven policy designer uses machine learning to develop the policies.

10. The method of claim 8, wherein the plurality of microservices comprises a plurality of reusable microservices.

11. The method of claim 8, wherein the data collected from a plurality of data sources comprises alarms.

12. The method of claim 8, wherein the data connector collects service chain data to identify transport types and network components.

13. The method of claim 8, wherein the data driven policy designer uses or creates policies to identify root causes of the network problems.

14. The method of claim 8, wherein the plurality of microservices are powered by machine learning or artificial intelligence and are available to be used by the shared communities.

15. A non-transitory computer readable storage medium having computer-executable instructions that, when executed, cause a computer system to:

collecting data from a plurality of network data sources in a data connector;

integrating the data into shared communities for insight development;

creating and storing templates and developing policies to implement service tasks to identify and isolate network problems; and integrating network and orchestration capabilities with big data technology to develop a plurality of microservices to perform the service tasks.

16. The non-transitory computer readable storage medium of claim 15, wherein the data driven policy designer uses machine learning to develop the policies.

17. The non-transitory computer readable storage medium of claim 15, wherein the plurality of microservices comprises a plurality of reusable microservices.

18. The non-transitory computer readable storage medium of claim 15, wherein the data connector collects service chain data to identify transport types and network components.

19. The non-transitory computer readable storage medium of claim 15, wherein the data driven policy designer uses or creates policies to identify root causes of the network problems.

20. The non-transitory computer readable storage medium of claim 15, wherein the plurality of microservices are powered by machine learning or artificial intelligence and are available to be used by the shared communities.

* * * * *